(12) United States Patent
Liu et al.

(10) Patent No.: US 8,369,606 B2
(45) Date of Patent: Feb. 5, 2013

(54) SYSTEM AND METHOD FOR ALIGNING MAPS USING POLYLINE MATCHING

(75) Inventors: Juan Liu, Milpitas, CA (US); Ying Zhang, Cupertino, CA (US); Gabriel Hoffmann, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 380 days.

(21) Appl. No.: 12/841,092

(22) Filed: Jul. 21, 2010

(65) Prior Publication Data

US 2012/0020533 A1 Jan. 26, 2012

(51) Int. Cl.
*G06K 9/00* (2006.01)
(52) U.S. Cl. .......................... 382/153; 382/106; 382/113
(58) Field of Classification Search ........................ None
See application file for complete search history.

(56) References Cited

PUBLICATIONS

C. Dedeoglu et al., "Landmark-based matching algorithm for cooperative mapping by autonomous robots," Distributed Autonomous Robotics Systems, Springer-Verlag, pp. 251-260 (2000).
C. Stachniss et al., "TORO- efficient constraint network optimization for SLAM," ICRA, http://webdiis.unizar.es/~neira/5007439/stachniss-toro.pdf (2006).
A. Howard et al., "Multi-robot mapping using manifold representations," IEEE International Conference on Robotics and Automation, New Orleans, Lousiana, pp. 4198-4203 (Apr. 2004).
A. Howard et al., "Multirobot simultaneous localization and mapping using Manifold representations," Proceedings of the IEEE- Special Issue on Multi-robot Systems, vol. 94, No. 9, pp. 1360-1369 (Jul. 2006).
B. Kuipers et al., "Local metrical and global topological maps in the hybrid spatial semantic hierarchy," IEEE International Conference on Robotics and Automation (2004).
M. Lopez-Sanchez et al., "Map generation by cooperative low-cost robots in structured unknown environment," Autonomous Robots, Kluwer Academic Publishers, vol. 5, pp. 53-61 (Mar. 1998).
J. H. Miller et al., "Detectors for discrete-time signals in non-Gaussian noise," IEEE Transactions on Information Theory, vol. IT-18, No. 2, pp. 241-250 (Mar. 1972).
E. Olson et al., "Fast iterative alignment of pose graphs with poor initial estimates," Proceedings of the IEEE International Conference on Robotics and Automation, Orlando, FL, pp. 2262-2269 (May 2006).
S. T. Pfister et al., "Weighted line fitting algorithms for mobile robot map building and efficient data representation," Proceedings of the IEEE International Conference on Robotics and Automation (2003).
S. I. Roumeliotis et al., "Segments: A layered, Dual-Kalman filter algorithm for indoor feature extraction," Proceedings of the IEEE/RSJ International Conference on Intelligent Robots and Systems (2000).
P. E. Rybski et al., "Appearance-based mapping using minimalistic sensor models," vol. 24 (Apr. 2008).
F. Savelli et al., "Loop-closing and planarity in topological map-building," IEEE/RSJ International Conference on Intelligent Robots and Systems (IROS-04), pp. 1511-1517, http://www.cs.utexas.edu/users/qr/papers/Savelli-iros-04.html (2004).

(Continued)

*Primary Examiner* — Amir Alavi
*Assistant Examiner* — Kenny Cese
(74) *Attorney, Agent, or Firm* — Patrick J. S. Inouye; Krista A. Wittman

(57) ABSTRACT

A system and method for aligning maps using polyline matching is provided. A global map and a local map are represented as polyline maps including a plurality of line segments. One or more approximate matches between the polyline maps are identified. One or more refined matches are determined from the approximate matches. The global map and the local map are aligned at the one or more refined matches.

14 Claims, 5 Drawing Sheets

PUBLICATIONS

Sebastian Thrun, "Learning Metric-Topological Maps for Indoor Mobile Robot Navigation," Artificial Intelligence, vol. 99, No. 1, pp. 21-71 (1998).

R. T. Vaughan et al., "Lost: Localization-space trails for robot teams," IEEE Transactions on Robotics and Automation, Special Issue on Multi-Robot Systems, vol. 18, No. 5, pp. 796-812 (Oct. 2002).

M. Veeck et al., "Learning polyline maps from range scan data acquired with mobile robots," IEEE/RSJ International Conference on Intelligent Robotics and Systems (2004).

D. F. Wolf et al., "Mobile robot simultaneous localization and mapping in dynamic environments," Autonomous Robots, vol. 19, No. 1, pp. 53-65 (Jul. 2005).

G. Wyeth et al., "Spatial cognition for robots," IEEE Robotics & Automation Magazine, pp. 24-32 (Sep. 2009).

M. S. Arulampalam et al., "A tutorial on particle filters for online nonlinear/non-Gaussian Bayesian tracking," IEEE Transaction on Signal Processing, vol. 50, No. 2, pp. 174-188 (Feb. 2002).

S. D. Cohen et al., "Partial matching of Planar polylines under similarity transformations," Eight Annual ACM-SIAM Symposium on Discrete Algorithms, pp. 777-786 (Jan. 1997).

B. Kamgar-Parsi et al., "Matching general polygonal arcs," CVGIP: Image Understanding, vol. 53, No. 2, pp. 227-234 (May 1991).

M. Tanase et al., "Multiple polyline to polygon matching," Proceedings of ISAAC, pp. 60-70 (2005).

D. R. Heisterkamp et al., "Matching of 3D polygonal Arcs," IEEE Transcastions on Pattern Analysis and Machine Intelligence, vol. 19, No. 1, pp. 68-73 (Jan. 1997).

Montemerlo et al., "FastSLAM: A Factored Solution to the Simultaneous Localization and Mapping Problem," Proceedings of the AAAI National Conference on Artificial Intelligence (2002).

SYSTEM AND METHOD FOR ALIGNING MAPS USING POLYLINE MATCHING

The U.S. Government has a paid-up license in this invention and the right in limited circumstances to require the patent owner to license others on reasonable terms as provided by the terms of Contract No. FA8650-08-C-7814 awarded by DARPA.

FIELD

This application relates in general to map alignment and, in particular, to a system and method aligning maps using polyline matching.

BACKGROUND

Mapping of, and localization within, an environment is critical for efficient and effective robot exploration and navigation. Mapping is useful for identifying features of the environment that can increase or hinder the objectives of the mobile robot. To function most effectively, mobile robots need to discover the properties of the physical environment they are located in. Knowing details of the location can assist navigation, communication, and object retrieval or placement. For example, identification of corners or intersections of hallways within an indoor environment is useful for surveillance and networking applications. Additionally, knowledge of whether a robot has previously traversed an area aids in maximizing battery life and minimizing time of exploration. Further, mapping the physical environment can help determine the size of the area explored by the robot, and, if the robot gets stuck or otherwise blocked by an obstacle, allows the robot to return to a known, higher value area.

Generally, mobile robots use self-contained on-board guidance systems, which can include environmental sensors to track relative movement, detect collisions, identify obstructions, or provide awareness of the immediate surroundings. Sensor readings are used to plan the next robotic movement or function to be performed. Movement can occur in a single direction or could be a sequence of individual movements, turns, and stationary positions.

Mapping of an environment can often consist of, or even require, multiple maps, each with possibly different characteristics or obtained through diverse techniques. For example, a global, or large, map such as a floor plan from building design may be given as prior knowledge or obtained by manual surveying. Conversely, a local, or small, map can be obtained from mobile robot exploration and sensing. The global and one or more local maps often need to be aligned. Map alignment is important to robot navigation as a stepping stone to a number of essential capabilities such as localization, loop detection, and map merging.

For example, by aligning a local map obtained by robot navigation with a global map, the location of the robot within the environment can be determined. Additionally, loop detection allows a robot to recognize repetitions in trajectory, which can be used to refine the map and improve mapping accuracy. Moreover, loop detection can prevent the robot from wasting energy traversing areas again that have already been explored. Furthermore, two or more robots may have built maps representing the part of an environment that they have each visited. Map alignment facilitates merging of the individual maps of each robot into a coherent larger map.

Conventional modes of mapping of a physical environment by robots include using a comprehensive sensor suite with long-range sensors, such as cameras, ultrasonic rangers, and light detection and ranging (LIDAR) to detect obstacles in front of, or surrounding, the robot. Long-range measurement of the environment has a large overhead, both economically due to the high cost of components, and efficiency, due to high power demands. Additionally, high-level computer cognitive models are used for environment mapping but incur a high computational overhead that often requires external, and time delayed, computation. These requirements for sensor-rich robots and powerful computation can be beyond the capabilities low-power robots with short-range sensors.

Therefore, there is a need for an approach to map alignment that is both cost-effective and efficient. Preferably, such an approach will be robust against reading noise, created by sensor misreadings and other errors.

SUMMARY

An embodiment provides a system and method for aligning maps using polyline matching. A global map and a local map are represented as polyline maps including a plurality of line segments. One or more approximate matches between the polyline maps are identified. One or more refined matches are determined from the approximate matches. The global map and the local map are aligned at the one or more refined matches.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
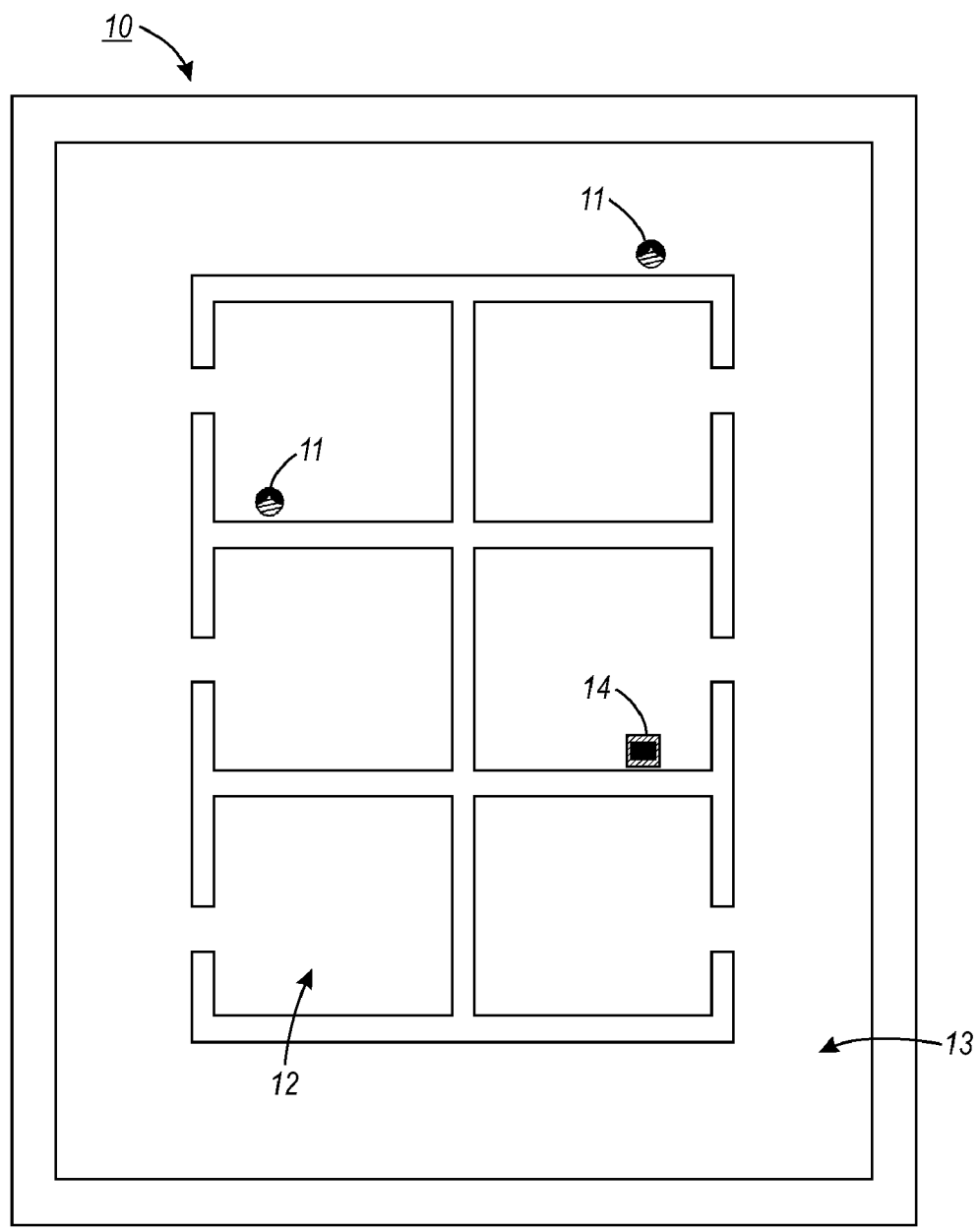
FIG. 1 is a block diagram showing, by way of example, a representative physical environment for deployment of a mobile robot.

A map can be generated based on data gathered by a mobile robot and compared and aligned with one or more other maps. FIG. 1 is a block diagram showing, by way of example, a representative physical environment 10 for deployment of a mobile robot 11. The physical environment can include one or more rooms 12 and hallways 13 separated by walls. One or more mobile robots 11 can be deployed within the physical environment 10. Additionally, one or more obstructions 14, or obstacles, can be in the environment 10.

The mobile robot 11 can include a power source, a communication interface to interface to other robots, base stations, and user nodes. The robot can also include motive power and a self-contained guidance system to move and guide the mobile robot about the environment, odometry to measure the distance traveled by, and position of, the mobile robot 11 within the environment, a left bump sensor and, optionally, a right bump sensor, and a heading component to calculate the heading of the robot around a 360 degree axis extending longitudinally through the center of the robot. In a further embodiment, the mobile robot 11 can include one or more short-range, such infrared or ultrasonic, wall sensors for detection of an object, such as a wall, prior to the robot coming into physical contact with the object. Other robot 11 structures and components are possible.

The robot 11 can also include an interface to a processor that can be implemented as an embedded micro-programmed system or as an external general-purpose portable computer system, such as a notebook computer. The processor includes one or more modules for analyzing data gathered by the robot to characterize the physical environment in which the robot is deployed, as described herein. The processor is a programmable computing device that executes software programs and includes, for example, a central processing unit, memory, network interface, persistent storage, and various components for interconnecting these components. The modules can be implemented as a computer program or procedure written as source code in a conventional programming language and is presented for execution by the central processing unit as object or byte code.

Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

In one embodiment, the data gathered is analyzed in real-time by the embedded, or on-board, processor and the output stored for later access in memory. In another embodiment, the output is stored on an external computer interfaced to by the robot 11 through the network interface. In a still further embodiment, data collected from multiple robots 11 is, grouped, analyzed, and compared in combination with one another. Other data analysis and storage combinations are possible.

Figure 2:
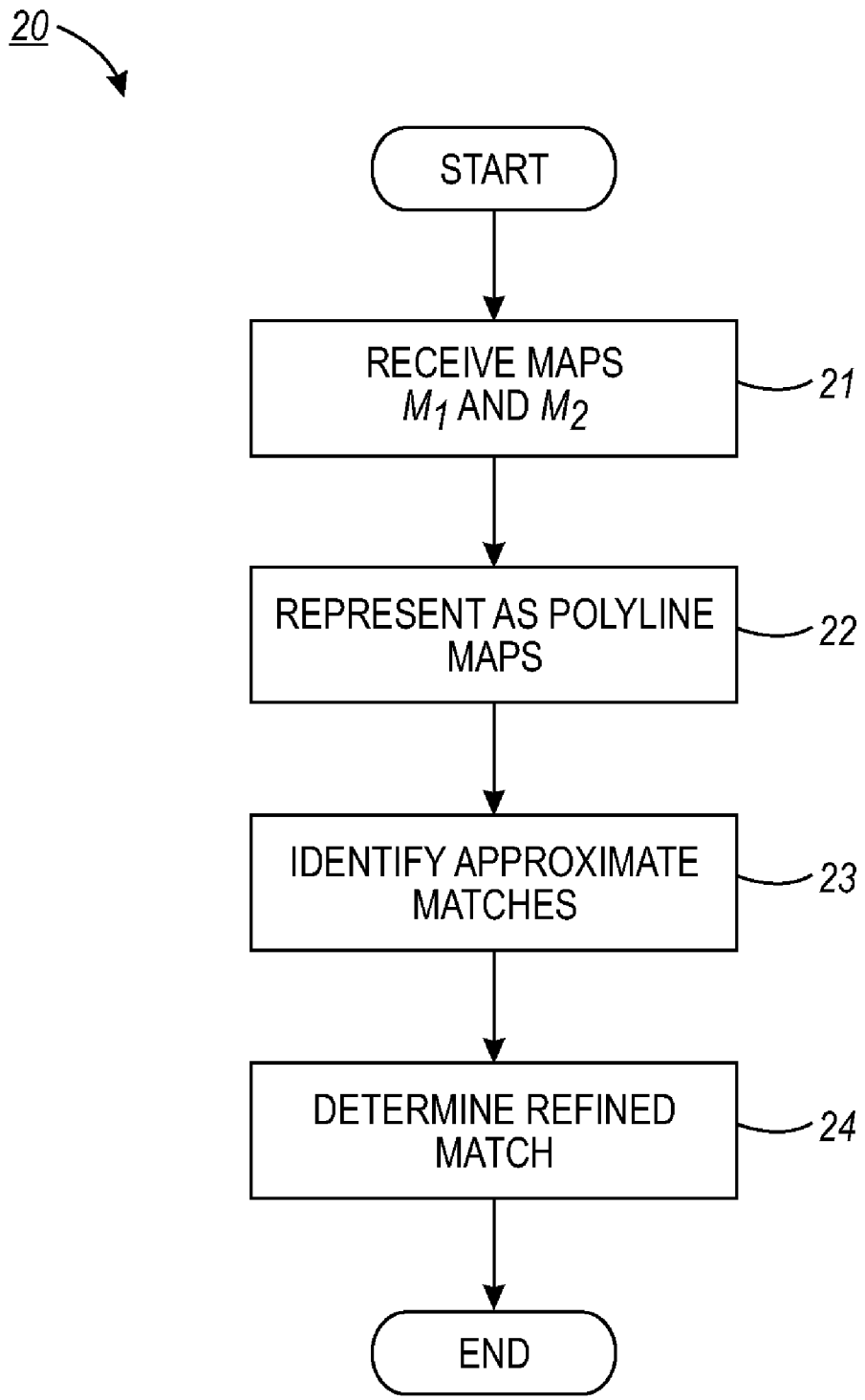
FIG. 2 is a flow diagram showing, by way of example, a method for aligning maps using polyline matching.

Map alignment facilitates localization, loop detection, and map merging for one or more mobile robots. FIG. 2 is a flow diagram showing, by way of example, a method for aligning maps using polyline matching. Two maps, Map 1, $M_1$, and Map 2, $M_2$, are obtained in real-time or retrieved from electronic storage (block 21) and each represented as a polyline map (block 22), as further discussed below with reference to FIG. 3. $M_1$ can be a prior known global map of the entire environment 10, such as determined through a building design, for example, a floor plan, manual surveying, or a partial map determined from mobile robot traversing a portion of the environment. $M_2$ is a local map that is determined from robot traversal, such as described in commonly-assigned U.S. patent application Ser. No. 12/841,065, entitled "System and Method for Real-Time Mapping of an Indoor Environment Using Mobile Robots with Limited Sensing," filed Jul. 21, 2010, pending, the disclosure of which is incorporated by reference. Other sources of $M_1$ and $M_2$ are possible.

Figure 4:
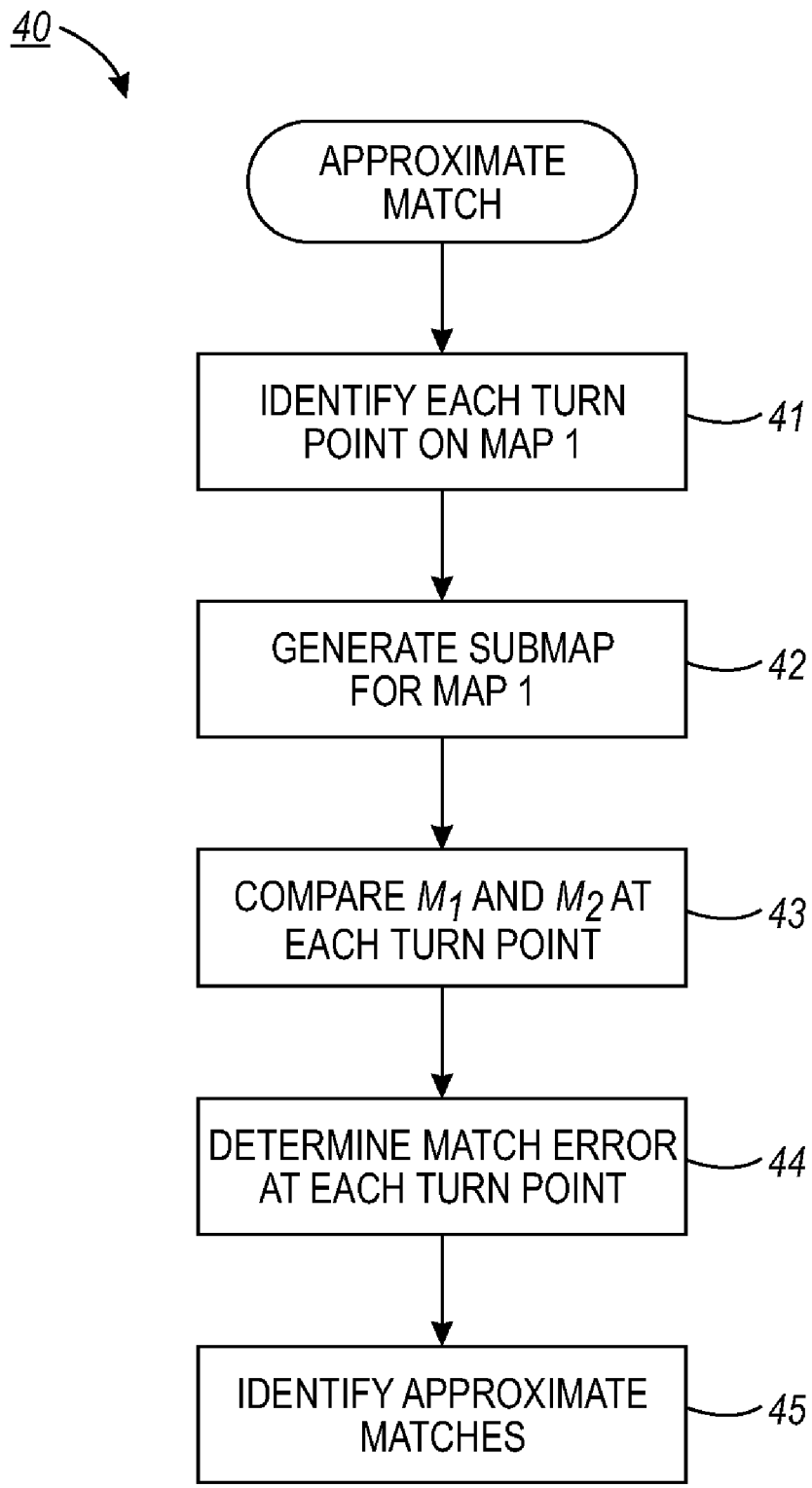
FIG. 4 is a flow diagram showing identification of approximate matches for use in the method of FIG. 2.

The two maps are initially compared to identify approximate matches (block 23), as further discussed below with reference to FIG. 4. Finally each of the identified approximate matches undergo finer-scale analysis and any refined matches are determined (block 24), as further discussed below with reference to FIG. 5.

Figure 3:
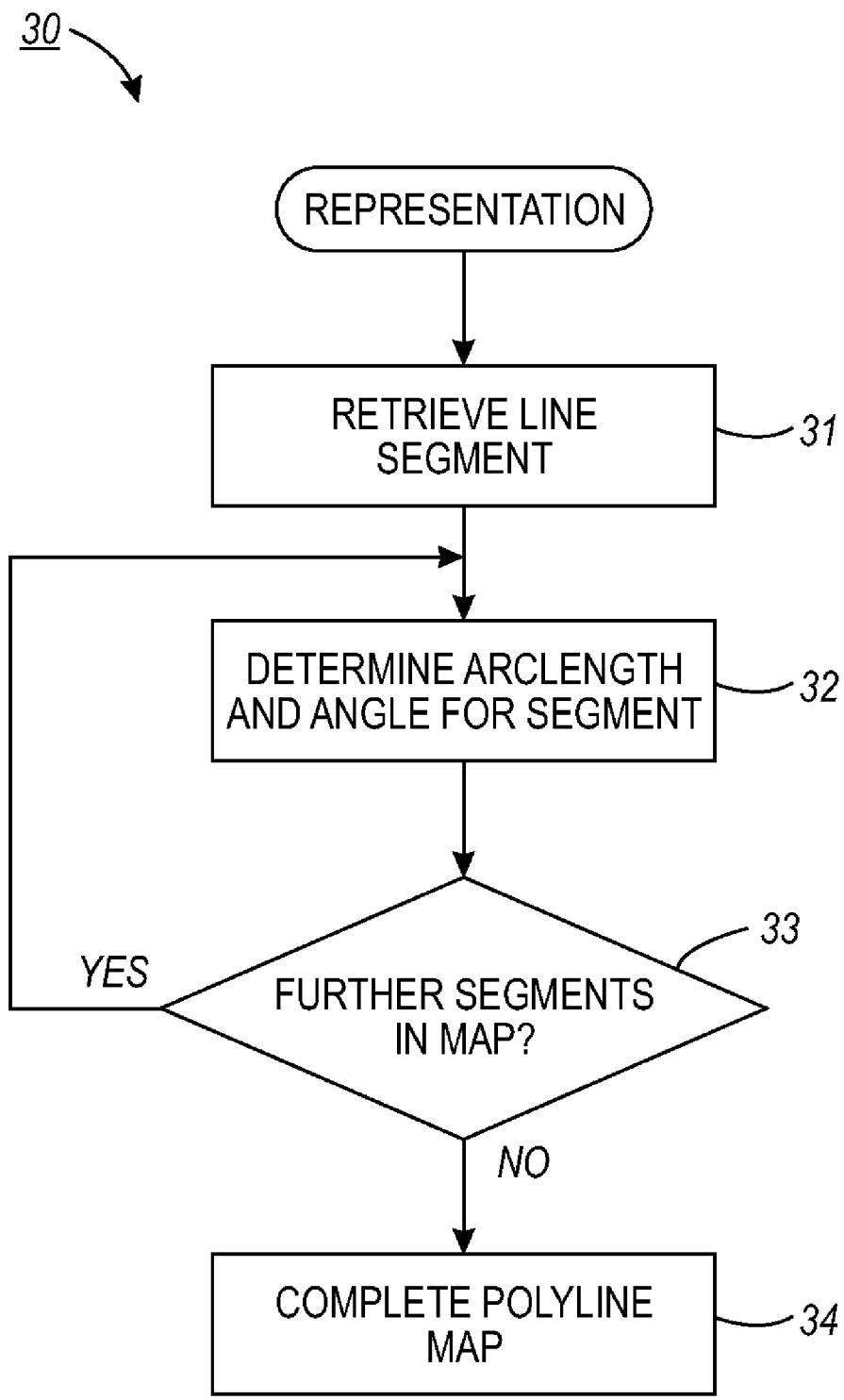
FIG. 3 is a flow diagram showing representation for use in the method of FIG. 2.

FIG. 3 is a flow diagram showing representation for use in the method of FIG. 2. Each map is represented as a polyline map where cumulative angle, $\theta$, of each line segment and arclength, s, of each line segment are the vertical and horizontal axes, respectively. Line segment data is retrieved from storage, manually entered into the system, or collected in real time by a mobile robot (block 31). Typically, line segment data is represented in list form, for example, where each line segment is denoted from starting and end points in an x-y plane. Other line segment representations are possible. Arclength and cumulative angle are determined for the initial line segment (block 32) and each remaining segment (block 33) according to the equations:

$$s_i = \sum_i \|e_i\| \text{ and}$$

$$\theta_i = \begin{cases} L(e_i, 0) & \text{if } i = 0 \\ L(e_{i-1}, e_i) + \theta_{i-1} & \text{if } i > 0 \end{cases}$$

where s is arclength and describes the length along the line segments, $\{e_0, e_1, \ldots, e_k\}$, traveled from the starting point, $e_0$, of the polyline and angle, $\theta$, is defined as the cumulative turning angle. Once the arclength and angle of each segment is determined, the polyline map is completed (block 34).

The local map, $M_2$, is used as a template, which can be matched against the global map, $M_1$, both along the horizontal, or s-direction, corresponding to sliding of the template, and along the vertical, or $\theta$-direction, corresponding to rotation of the template, as further discussed below with reference to FIG. 4. In a further embodiment either the local map or global map can be used as the template against the other map.

Map alignment occurs in two stages. The first stage, approximate match, is a screening step that identifies possible candidate match locations between the global and local maps by geometric computation while not allowing any variation in line segment length. The second stage, refined match, examines the identified candidate matches in greater detail to find the exact match location and allows for adjustment to line segment length and structure. Identifying approximate matches prior to the more intensive optimization during refined matching reduces computational overhead. FIG. 4 is a flow diagram showing identification of approximate matches for use in the method of FIG. 2. Each turning point in the global map is identified (block 41). A submap, $M_1^{sub}$, of the global map is generated for each point starting from the i-th turning point, where i=1, 2, . . . K, with a length equal to the cumulative length of the local map, $M_2$ (block 42). The submap can be a subset or the entire length of $M_1$. $M_1^{sub}$ and $M_2$ are then compared at each turning point (block 43) and a matching error between the maps is determined at each point (block 44). The first turning point of $M_1^{sub}$ is anchored to the first turning point of $M_2$. The process is repeated for every submap starting form the i-th turning point. The matching error, $e_i$, at each turning point is determined as the Euclidean norm of the difference. The matching error can be determined according to the equation:

$$(\int [\theta(s)^{M2} - \theta(s)^{M1Sub}]^2 ds)^{1/2}$$

where the difference between the two functions is obtained, and then the integral of the squared error is computed. A matching error value of zero indicates a perfect match, while a low matching error value, for example 0.1 grad or 5.7 degrees, can be considered a good match at turning point i.

Figure 5:
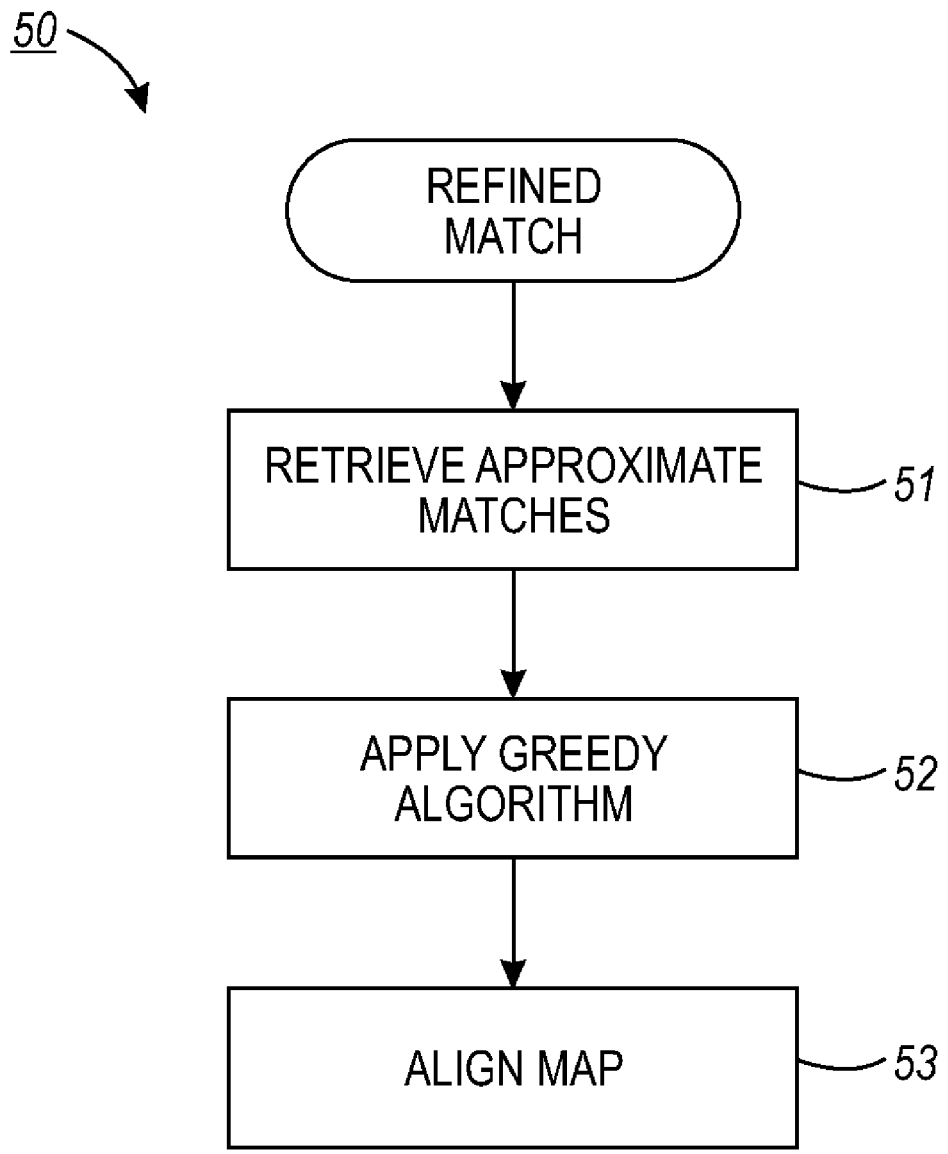
FIG. 5 is a flow diagram showing refined matching for use in the method of FIG. 2.

Those matches that have the lowest amount of matching error are identified as approximate matches (block 45) and further analyzed during refined matching, as further discussed below with reference to FIG. 5. The matches identified as approximate matches can be based on a predetermined threshold value, such as 0.175 grad or 10 degrees, or as a set number, or percentage, of matches with the lowest matching errors. Other ways to identify approximate matches are possible. Computation of each approximate match is proportional to the length of $M_2$. As match error is determined for each i value, the overall computation is given by the equation $O(length|M_2|?(\#node\_in\_M_1))$. $Length|M_2|$ refers to the cumulative length, or sum of length of all the line segments, of map $M_2$, and # of node in $M_1$ is the number of line segments in $M_1$.

During refined matching, each line segment can be adjusted in segment length and structure for finer-grain match analysis. FIG. 5 is a flow diagram showing refined matching for use in the method of FIG. 2. Map data, especially data collected by mobile robots, may be noisy due to sensor error or other reasons. Consequently, errors in segment length or turn data gathering can occur. For example, when $M_1^{sub}$ and $M_2$ have a matching sequence of turning angles but differ in line segment length, the line segments of $M_2$ are adjusted, by stretching or shrinking a particular line segment, to match the length of the corresponding line segments of $M_1^{sub}$. On the other hand, when a line segment needs to be stretched or shrunk by a large amount, indicating more than mapping noise, a line segment in $M_2$ may need to be adjusted in structure, such as segmented into two or more smaller line segments, to match $M_1^{sub}$. This approach is symmetric. Since two maps, $M_1^{sub}$ and $M_2$, are being matched, either $M_1^{sub}$ can be matched against $M_2$, or $M_2$ can be used to match against $M_1^{sub}$.

To determine whether a line segment needs to be adjusted in length or, instead, structure, the cost function associated with each approach is determined and the approach with the lower cost is chosen based on a greedy algorithm. The cost function is determined according to the equation:

$$\epsilon = \|f(d_1, \ldots, d_k) - g(d_1 + \Delta d_1, \ldots, d_k + \Delta d_k)\|^2 + \alpha \|\Delta d_1, \ldots \Delta d_k\|^2 \quad (1)$$

where $\{d_1, \ldots, d_k\}$, represents the length of each segment in the polylines, $f(\bullet)$ is the polyline map $M_1^{sub}$, and $g(\bullet)$ is the polyline map $M_2$. The first term of the cost function, $\|f-g\|^2$, measures the match accuracy, or deviation, between $M_2$ and $M_1^{sub}$. Each line segment can vary in length by some moderate amount $?d_i$. The overall length perturbation, $\alpha\|\Delta d_1, \ldots \Delta d_k\|^2$, where a is a regularization parameter controlling the tradeoff between matching accuracy and length modification, is included in the cost function and is kept small, such as a value of 0.05 or 0.1. Other values are possible. The beginning matching point, or translation, and rotation, hence $f$, as well as a set of length perturbations $\{?d_i\}$, is determined such that e is minimized.

The cost function results in a balance between matching accuracy, the first term, and length perturbation, the second term. Without the second term, the first term becomes trivial. For example, any line segment of $M_1^{sub}$ can be cut into an infinite number of zero-length segments with arbitrary slope, then each line can be stretched to match with map $M_2$, which is not a useful approach. But if the line segments are considered to have moderate elasticity, the second term puts constraints on the elasticity. Furthermore, the weight a adjusts the balance between the two terms. When a is small, the line segments are more elastic and can be adjusted more in order to match the two maps. On the other hand, when a goes to infinity, the second term disallows any variation in line length, and the whole problem degenerates into an arclength matching problem.

In any event, the approximate matches are retrieved (block 51) and a greedy algorithm is applied to the approximate matches to determined whether one or more line segments should be adjusted in length or structure (block 52). Once the choice is determined by the greedy algorithm the two maps are aligned (block 53). Map alignment can be used for robot localization within a larger environment, combining local maps generated by multiple robots, and loop detection.

The greedy algorithm starts with the first line segment of $M_2$ and then moves to later segments. For any given segment $e_i$, or current segment, two choices exist. Choice One is to adjust the segment length of the line segment of $M_2$ to match the corresponding segment of $M_1$. The cost, $e_i$, associated with Choice One consists of three parts:

match error $(\angle e_i^{(1)} - \angle e_i^{(2)})^2 \cdot \|e_i^{(1)}\|$, which is zero since $M_1$ and $M_2$ have the same direction, and where $e_i^{(1)}$ is the line segment of $M_1$ and $e_i^{(2)}$ is the line segment of $M_2$;

stretch potential $\alpha(\|e_i^{(1)}\| - \|e_i^{(2)}\|)^2$; and implication on later segments, $\epsilon^+$.

Stretching decisions not only affect the match error of the current segment, but also on later segments. The future matching error is determined using the approximate match algorithm, as discussed above with reference to FIG. 4. A decaying forget factor, ?, where ?<1 is used to weigh future implications. The stretch potential replaces the second term, and $\epsilon^+$ is first term, $\|f-g\|^2$, in the cost function of equation (1) as discussed above with reference to FIG. 5.

Choice Two for the greedy algorithm is to adjust the structure of the current segment, $e_i$. If $e_i$ is much longer, for example double the length, in $M_2$ than in $M_1$, then $e_i^{(2)}$ may need to been broken down into two segments. If $e_i$ is much shorter, such as twice as short, in $M_2$ than in $M_1$, then $e_i^{(1)}$ may need to be broken down. The three cost terms for Choice Two are:

match error $(\angle e_i^{(1)} - \angle e_i^{(2)})^2 \cdot \|e_i^{(1)}\|$, which is zero since $M_1$ and $M_2$ have the same direction;

stretch potential $\alpha(\|e_i^{(1)}\| - \|e_i^{(2)}\|)^2$; and implication on later segments, $?\epsilon^+$.

If the overall cost associated with Choice One is lower than that of Choice Two then the action of Choice One is taken, otherwise the action of Choice Two is taken.

While the invention has been particularly shown and described as referenced to the embodiments thereof, those skilled in the art will understand that the foregoing and other changes in form and detail may be made therein without departing from the spirit and scope of the invention.

What is claimed is:

1. A system for aligning maps using polyline matching, comprising:
    a processor to execute the following modules, comprising:
    a representation module representing a global map and a local map as polyline maps comprising a plurality of line segments;
    an approximation module identifying one or more approximate matches between the polyline maps;
    a refinement module determining one or more refined matches from the approximate matches, comprising:
    an algorithm module applying a greedy algorithm comprising two choices to the approximate matches; and
    a cost module determining a cost function associated with each of the two choices and choosing the choice with the lowest cost function, wherein the cost function is determined according to the equation:

$$\epsilon = \|f(d_1, \ldots, d_k) - g(d_1 + \Delta d_1, \ldots, d_k + \Delta d_k)\|^2 + \alpha \|\Delta d_1, \ldots \Delta d_k\|^2$$

where $\{d_1, \ldots, d_k\}$ represents length of each segment in polylines f(•) is a polyline map $M_1^{sub}$, g(•) is polyline map $M_2$, $\|f-g\|^2$ is match accuracy, or deviation, between $M_2$ and $M_1^{sub}$, and $\alpha\|\Delta d_1, \ldots \Delta d_k\|^2$ is overall length perturbation, where $\alpha$ is a regularization parameter controlling tradeoff between match accuracy and length modification $\Delta d_i$; and an alignment module aligning the global map and the local map at the one or more refined matches.

2. A system according to claim 1, further comprising:
a receiver module receiving the plurality of line segments for each of the global map and the local map; and
a polyline module determining an arclength and an angle for each segment and generating the polyline map for each map.

3. A system according to claim 1, further comprising:
a submap module identifying each turn point of the global map and the local map and generating a submap of the global map with a length equal to the local map; and
an error module comparing the submap and the local map at each of their respective turning points, determining a match error at each of the compared turning points, and identifying the compared turning points with the lowest match errors as candidate matches.

4. A system according to claim 3, wherein the candidate matches are one of below a predetermined threshold, a set number, and a percentage of total determined match errors.

5. A system according to claim 1, wherein the two choices are adjust line segment length and adjust line segment structure.

6. A system according to claim 1, wherein the cost function comprises terms for match error, stretch potential, and implication on later segments.

7. A system according to claim 1, wherein the global map and local map are determined by one of a floor plan, manual surveying, and mobile robot navigation.

8. A method for aligning maps using polyline matching, comprising:
representing a global map and a local map as polyline maps comprising a plurality of line segments;
identifying one or more approximate matches between the polyline maps;
determining one or more refined matches from the approximate matches; matches, comprising:
applying a greedy algorithm comprising two choices to the approximate matches;
determining a cost function associated with each of the two choices, wherein the cost function is determined according to the equation:

$$\epsilon = \|f(d_1, \ldots, d_k) - g(d_1 + \Delta d_1, \ldots, d_k + \Delta d_k)\|^2 + \alpha \|\Delta d_1, \ldots \Delta d_k\|^2$$

where $\{d_1, \ldots, d_k\}$ represents length of each segment in polylines, f(∩) is polyline map $M_1^{sub}$, g(•) is polyline map $M_2$, $\|f-g\|^2$ is match accuracy, or deviation, between $M_2$ and $M_1^{sub}$, and $\alpha\|\Delta d_1, \ldots \Delta d_k\|^2$ is overall length perturbation, where $\alpha$ is a regularization parameter controlling tradeoff between match accuracy and length modification $\Delta d_i$; and choosing the choice with the lowest cost function; and
aligning the global map and the local map at the one or more refined matches.

9. A method according to claim 8, further comprising:
receiving the plurality of line segments for each of the global map and the local map;
determining an arclength and an angle for each segment; and
generating the polyline map for each map.

10. A method according to claim 8, further comprising:
identifying each turn point of the global map and the local map;
generating a submap of the global map with a length equal to the local map;
comparing the submap and the local map at each of their respective turning points;
determining a match error at each of the compared turning points; and
identifying the compared turning points with the lowest match errors as candidate matches.

11. A method according to claim 10, wherein the candidate matches are one of below a predetermined threshold, a set number, and a percentage of total determined match errors.

12. A method according to claim 8, wherein the two choices are adjust line segment length and adjust line segment structure.

13. A method according to claim 8, wherein the cost function comprises terms for match error, stretch potential, and implication on later segments.

14. A method according to claim 8, wherein the global map and local map are determined by one of a floor plan, manual surveying, and mobile robot navigation.

\* \* \* \* \*